L. H. COBB.
BICYCLE FORK.
APPLICATION FILED MAR. 25, 1909.
963,992.
Patented July 12, 1910.
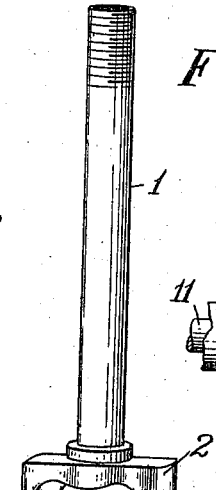
Fig. 1.
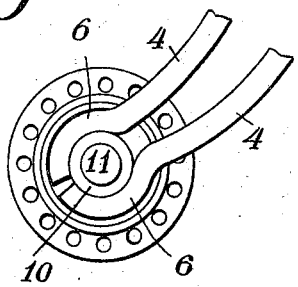
Fig. 2.
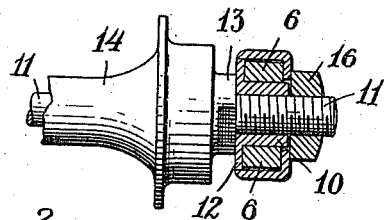
Fig. 3.
Fig. 5.
Fig. 4.
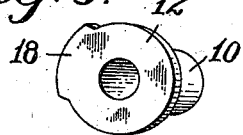
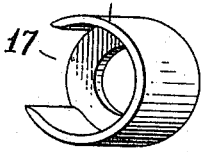
Fig. 6.
Witnesses
R. D. Tolman
Penelope Cumberbach
Inventor
Lyman H. Cobb.
By Rufus B. Fowler
Attorney

UNITED STATES PATENT OFFICE.

LYMAN H. COBB, OF FITCHBURG, MASSACHUSETTS, ASSIGNOR TO MARY ELIZABETH JOHNSON, TRUSTEE, OF FITCHBURG, MASSACHUSETTS.

BICYCLE-FORK.

963,992.
Specification of Letters Patent. Patented July 12, 1910.
Application filed March 25, 1909. Serial No. 485,684.

*To all whom it may concern:*

Be it known that I, LYMAN H. COBB, a citizen of the United States, residing at Fitchburg, in the county of Worcester and Commonwealth of Massachusetts, have invented a new and useful Improvement in a Bicycle-Fork, of which the following is a specification, accompanied by drawings forming a part of the same, in which—

Figure 1 is a perspective view of a bicycle fork embodying my present invention. Figs. 2 and 3 show the wheel hub and spindle and the lower portion of one of the elastic spring arms of the fork, showing the method of its attachment to the wheel spindle. Figs. 4 and 5 are perspective views of the cap and flanged bushing respectively, by which the fork is attached to the wheel spindle, and Fig. 6 is a detached view of a portion of the fork, showing in section the joint between the spring arm and the upper portion of the fork.

Similar reference figures refer to similar parts in the different views.

My invention relates to the front fork and steering head of a bicycle, and it has for its object to provide an improved construction which embodies in the prongs of the fork elastic or spring arms, as hereinafter described, the novel features being pointed out in the annexed claims.

Referring to the accompanying drawings, 1 is the steering post of a bicycle, 2 the fork crown and 3, 3, the upper or rigid portions of the prongs of the front fork. The post 1, fork crown 2, and the upper portions 3 of the prongs are similar in construction to those of an ordinary bicycle, and form no part of my present invention.

The lower portion of the prongs comprise curved arms 4, each formed from a flat bar of steel, having a return bend 5 at its central section, and with their ends bent outwardly and inwardly in concentric circular arcs 6 as shown in Fig. 2. The upper portions 3, 3, of the fork are preferably tubular and terminate at their lower ends 7 in forgings which are milled concentrically with the return bend 5, to form a lip 8 and a recess 9 adapted to receive the bent section 5 of the spring arm 4, which is attached to the forging by brazing or similar means.

A flanged bushing 10, shown in Fig. 5, is mounted upon a spindle 11 of the front wheel, with its flanged end 12 in contact with the end of one of the ball cones 13 which provide bearings for the wheel hub 14. The curved ends 6 of the spring arms 4 inclose the bushing 10, as shown in Fig. 2, and are held in engagement therewith by a cup-shaped cap 15, shown in Fig. 4, which is held in position by a nut 16 on the screw threaded end of the spindle 11. The cap 15 has an opening 17 in its side to receive the spring arms 4, and the flange is provided with a radial expansion 18 which engages the opening 17 and thereby holds the bushing 10 from rotation.

The ball cones 13 are adjusted in the usual manner on the screw threaded ends of the spindle 11, in order to provide suitable bearings for the revolving hub 14; the bushings 10 are then placed upon the spindle 11 and the concentrically curved ends 6 are applied to the bushings 10. The caps 15 are placed over the ends of the spring arms and are held in place by the nuts 16.

I am aware that it is not new to provide a bicycle fork with elastic or spring members between the wheel spindle 11 and the crown 2, rendering the entire prongs subject to a yielding movement under a load. I make the upper portion of the prongs rigid and only approximately the lower half elastic, thereby confining the yielding movement to that portion of the prongs nearest the wheel. I am, therefore, able to adjust the elasticity of the spring members to the load to be borne, and also to the curved section of the prongs, which I have found in practice to afford the best results for the reason that the elasticity of the spring must be sufficient to respond to slight inequalities of the road and yet stiff enough to prevent a too violent movement of the saddle under severe jolts.

The joint between the rigid and elastic sections of the fork needs to be exceedingly strong to resist any strains applied thereto during use, and the connection between the fork and the wheel spindle must be absolutely firm and enable the wheel spindle to be readily removed. These results are accomplished in a simple and inexpensive manner easy of construction, affording great sensitiveness to any inequalities of the road by a yielding movement approximately in a vertical plane confined to the curved lower sections of the fork.

I claim,

1. A bicycle fork, comprising prongs with the upper portion of said prongs rigid and the lower portion formed from a single spring bar of approximately the same thickness throughout, with a return bend in its central section at its point of attachment to said upper portion and with the end of each arm of said spring bar attached to the wheel spindle.

2. A bicycle fork, comprising prongs with the upper portion of said prongs rigid and with the lower portion formed of a pair of noncontacting elastic blades attached to the lower end of said rigid portion, and with the lower ends of said blades bent to inclose the wheel spindle.

3. A bicycle fork, comprising a crown and prongs, having their upper portions rigid and their lower portions formed of an elastic bar bent at their central sections and attached to the ends of said rigid sections, with the free ends of said elastic sections converging and curved concentrically to inclose the wheel spindle.

4. In a bicycle fork, the combination with a wheel spindle, of flanged bushings inclosing the spindle, a crown, and prongs each comprising a pair of elastic blades bent at their free ends to inclose said flanged bushings, and cup-shaped caps inclosing the ends of said elastic blades.

5. In a bicycle fork, the combination of a pair of elastic blades having their ends curved in concentric circular arcs, a bushing inclosed between said curved ends, and a cup-shaped cap inclosing said curved ends.

6. In a bicycle fork, the combination with a wheel spindle, a flanged bushing held thereon, elastic blades supported from the fork crown with their ends inclosing said bushing, and a cup-shaped cap inclosing the ends of said blades and interlocked with said flanged bushing to prevent the rotation of the bushing.

7. A bicycle fork having curved elastic blades, said blades having a return bend, with their free ends bent to engage a bushing mounted on the wheel spindle, a cap inclosing said ends, and means for holding said cap and bushing on the wheel spindle.

8. A bicycle fork having curved elastic blades forming the lower portion of each prong of the fork, said blades having a return bend held in a concentric recess in the upper portion of the fork prong, with the free ends of said blades bent to engage a bushing mounted on the wheel spindle, a cap inclosing said ends, and means for holding said cap and bushing on the wheel spindle.

Dated this 20th day of March 1909.

LYMAN H. COBB.

Witnesses:
PENELOPE COMBERBACH,
NELLIE WHALEN.